United States Patent [19]
Luyckx et al.

[11] Patent Number: 5,532,836
[45] Date of Patent: Jul. 2, 1996

[54] APPARATUS FOR GRADUALLY SWITCHING VIDEO PRESENTATION OF STORED PICTURES

[75] Inventors: Erik Luyckx; Jozef M. K. Timmermans, both of Hasselt, Belgium

[73] Assignee: U.S. Philips Corporation, New York, N.Y.

[21] Appl. No.: 541,999

[22] Filed: Oct. 10, 1995

Related U.S. Application Data

[63] Continuation of Ser. No. 101,323, Aug. 2, 1993, abandoned.

[30] Foreign Application Priority Data

Aug. 3, 1992 [EP]  European Pat. Off. .............. 92202393

[51] Int. Cl.⁶ ..................................................... H04N 5/76
[52] U.S. Cl. ........................... 358/335; 348/594; 348/595; 348/597; 348/585; 360/13
[58] Field of Search ...................................... 358/335, 310, 358/311, 906, 909.1; 348/594, 595, 597, 593, 590, 585, 584, 571, 578; 360/13, 14.1, 33.1; H04N 5/76, 5/262, 5/265

[56] References Cited

U.S. PATENT DOCUMENTS

| | | | |
|---|---|---|---|
| 4,218,711 | 8/1980 | Kashigi | 348/594 |
| 4,740,832 | 4/1988 | Sprague et al. | 358/21 R |
| 4,855,834 | 8/1989 | Cawley et al. | 348/594 |
| 5,008,755 | 4/1991 | Brain | 348/594 |

FOREIGN PATENT DOCUMENTS

| | | |
|---|---|---|
| 63-052235 | 3/1988 | Japan . |
| 8802907 | 4/1988 | WIPO . |
| 9205554 | 4/1992 | WIPO . |
| 9205556 | 4/1992 | WIPO . |
| 9205651 | 4/1992 | WIPO . |
| 9205652 | 4/1992 | WIPO . |
| 9205653 | 4/1992 | WIPO . |
| 9205657 | 4/1992 | WIPO . |
| 9205658 | 4/1992 | WIPO . |

*Primary Examiner*—Thai Q. Tran
*Assistant Examiner*—Khoi Truong
*Attorney, Agent, or Firm*—David R. Treacy

[57] ABSTRACT

An apparatus for reading picture data stored on a record carrier for first and second pictures, and providing an output video signal which changes smoothly from the first to the second picture. The apparatus has a single picture memory having storage locations for values representing individual pixels, and a converter for converting signal values fetched from the memory into a video signal. Data for a new picture are read into the memory without such adaptation as filtering or correcting color resolution. During intervals when the memory is not otherwise being accessed, newly recorded data are adapted and the adapted data are then stored. Priority are given to fetching data for the video generator, and loading data read from the record carrier.

18 Claims, 7 Drawing Sheets

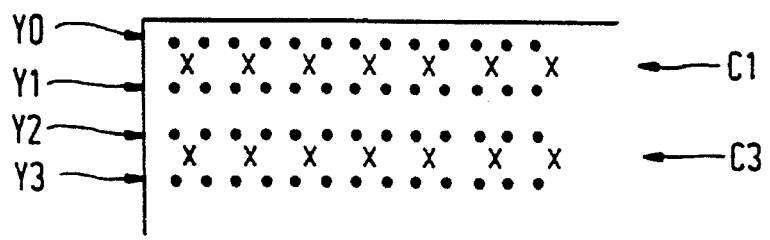
FIG.1
$$Y_0, Y_1, C_1, Y_2, Y_3, C_3, \ldots\ldots$$
FIG.2
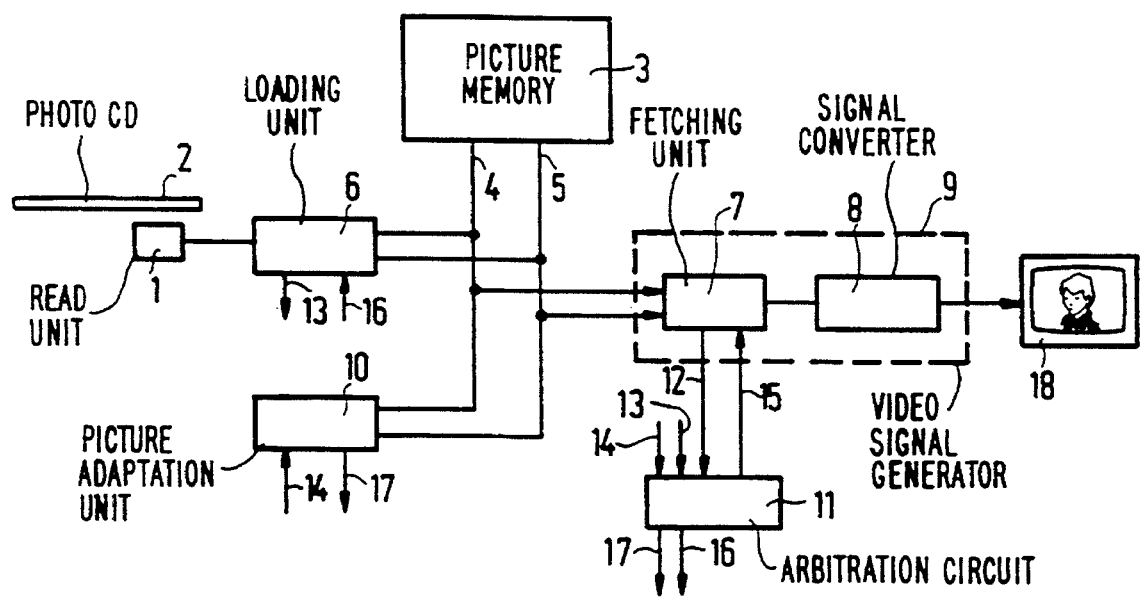
FIG.3

APPARATUS FOR GRADUALLY SWITCHING VIDEO PRESENTATION OF STORED PICTURES

This is a continuation of application Ser. No. 08/101,323, filed Aug. 2, 1993 now abandoned.

BACKGROUND OF THE INVENTION

The invention relates to an arrangement for reading a record carrier on which picture information has been recorded, which picture information represents a picture composed of pixels, which arrangement comprises a picture memory having addressable storage locations for the storage of signal values representing the pixels of a still picture, video signal generating means for continuously generating a video signal at a predetermined picture rate, which video signal is defined by the signal values stored, which video signal generating means comprise means for carrying out a fetching process in which the signal values are periodically fetched from the storage locations of the picture memory in a predetermined sequence and means for converting the fetched signal values into the video signal, read means for reading picture information of a new picture recorded on the record carrier, and means for carrying out a loading process in which previously stored signal values in the storage locations are replaced by new signal values defined by the read-out picture information.

An arrangement of the type defined in the opening paragraph is known inter alia from U.S. Pat. No. 4,740,832. The arrangement described therein is a Compact Disc player for reading compressed picture information. After read-out this compressed picture information is decompressed. After this operation the picture is stored in the picture memory as a luminance bit map and two color bit maps. The luminance bit map contains the luminance information for each pixel of the video picture and the color bit maps represent the color information of the video picture with a horizontal and a vertical resolution lower than the resolution of the luminance information. The picture memory is of a type divided into two memory sections which can be addressed independently of each other and which are both accessible at the same time. One of the two memory sections stores the signal values for the even picture lines of the picture and the other memory section stores the signal values of the odd lines of the picture. The signal values in both sections each represent one field of the video picture. During display all the signal values of a field are fetched from the memory before the signal values of the next field are fetched, so that the two memory sections are used alternately for fetching the signal values. During the time in which the signal values are fetched from one memory section it is possible to adapt the signal values in the other memory section. As already stated, the vertical and the horizontal resolution of the stored color information is lower than the resolution of the luminance information. As during the generation of the video signal both the color information and the luminance information must be available for each pixel in the video picture the resolution is enhanced in an information adaptation process. This information adaptation process is performed by means of an additional circuit, to which the color information fetched from the picture memory is applied and which enhances the horizontal and the vertical resolution of the color information by means of interpolation techniques. For the vertical interpolation it is required that at the same time the color information of a plurality of color picture lines is available. This requirement is met by providing the additional circuit with a number of line memories for the storage of the color picture lines.

The known arrangement has several drawbacks. First of all, the fact that the picture memory comprises two independently accessible memory sections requires a large number of provisions. For example, two address buses are required to address the two memory sections, which is problematic merely because of the space required for this purpose. Secondly, the use of color line buffers for the storage of the color lines is undesirable because of the cost involved.

SUMMARY OF THE INVENTION

It is an object of the invention to provide an arrangement of the type defined in the opening paragraph, which mitigates the drawbacks mentioned above.

According to the invention this object is achieved in that the arrangement comprises means for carrying out at least one information adaptation process on the basis of the new signal values stored in the storage locations, in which process at least a part of the stored signal values is adapted, control means for alternately giving one of the processes exclusive access to the picture memory during the generation of video signals, which control means comprise arbitration means which in accordance with predetermined priority rules determine which of the processes is given access to the picture memory, the priority of the adaptation process being lower than the priority of the fetching and loading process.

In the arrangement in accordance with the invention only one storage location at a time has to be addressed, so that one address bus is adequate. Since the information adaptation process extracts the data necessary for the information adaptation process from the picture memory itself and also stores the results of the information adaptation process in the picture memory large additional buffer memories can be dispensed with. The invention is particularly suitable to be used for the reproduction of pictures recorded on a so-called Photo CD. When such a Photo CD is read the information required for a picture becomes available comparatively slowly (within a few seconds). This means that in the horizontal retrace interval and the vertical retrace interval of the video signal, in which no signal values are required for the generation of the video signal and consequently no information has to be fetched, access to the picture memory is possible for a time which is amply sufficient to load the signal values read out. When the video signal is displayed this results in a gradual replacement of an existing picture by a new picture. This process of gradually replacing an existing picture by a new picture is also referred to as "image wiping". Since the time required for the loading process and the fetching process is less than the available time it is also possible to perform a necessary information adaptation process, such as enhancing the vertical resolution of the color information.

The signal values of a new picture which have not yet been subjected to an information adaptation process may cause the displayed video picture to be disturbed. However, since the information adaptation process can adequately access the picture memory in the time intervals in which the fetching and loading process do not require access, the information adaptation process will generally not be much behind the loading process, so that the disturbed part of the video picture will be small. Moreover, the disturbed part is situated in the transitional area between the picture to be replaced and the new picture. These disturbances are comparatively inconspicuous.

Apart from the information adaptation process for improving the vertical resolution of the color information it is often also desirable to subject the luminance information to a filter operation in order to remove high-frequency components. This is because the presence of high-frequency components gives rise to annoying picture flicker.

An embodiment of the invention which is particularly suitable for performing more than one information adaptation process upon the signal values of the newly loaded picture, for example enhancing the color resolution and filtering the luminance information, is characterized in that the arrangement comprises means for carrying out at least a second information adaptation process on the basis of the new signal values stored in the storage locations, in which process at least a part of the stored signal values is adapted, the means for carrying out the first and the second information adaptation process comprising first and second address-generating means for generating a first address and a second address, the first address indicating the transition between the storage locations with signal values already adapted by the first information adaptation process and the storage locations with signal values yet to be adapted by the first information adaptation process, and the second address indicating the transition between the storage locations with signal values already adapted by the second information adaptation process and the storage locations with the signal values yet to be adapted by the second information adaptation process, the arbitration means assigning priorities to the first and the second information adaptation process in dependence upon the difference between the first and the second address in order to keep said difference within certain limits.

This embodiment has the advantage that the two information adaptation processes remain in step. This minimizes the disturbed picture area.

In addition to picture information the Photo-CD also enables audio information to be recorded, for example in the form of time-compressed audio information. The time-expansion process of such information also requires storage capacity. It is advantageous if the required storage capacity is provided by the picture memory instead of by an additional memory unit which can be addressed independently of the picture memory. This minimizes the amount of hardware needed for controlling the memory. An embodiment of an arrangement in which the expansion process utilizes storage capacity accommodated in the picture memory is characterized in that the arrangement comprises means for carrying out additional processes requiring exclusive access to the picture memory, the arbitration means assigning a higher priority to the additional processes than to the information adaptation processes.

When picture information is being read it is important that no read information is lost. During the generation of the video signals it is also important that all the required information becomes always available. Since the loading process and the fetching process cannot access the memory simultaneously at least one of these two processes should utilize a buffer memory. If, as is the case during read-out of a Photo-CD, the amount of information to be fetched per unit of time is substantially larger than the amount of data to be loaded per unit of time, it is to be preferred that the fetching process is given a higher priority of access to the memory than the loading process and that the loading process uses a buffer memory for the temporary storage of the read-out signal values until the loading process has been given access to the picture memory in order to load the signal values. The required capacity of these buffer memories is dictated by the waiting time before a process is given access.

An embodiment of the arrangement for which the waiting time is short is characterized in that the control means each time give one of the processes access to the picture memory during a memory access interval, the arbitration means being adapted to determine prior to the beginning of each memory access interval which of the process is given access to the picture memory in accordance with the priority rules.

BRIEF DESCRIPTION OF THE DRAWINGS

The invention will now be described in more detail with reference to FIGS. 1 to 18, in which FIG. 1 shows diagrammatically the relationship between a picture and the signal values representing this picture, FIG. 2 illustrates the sequence in which the various signal values have been recorded on the record carrier, FIGS. 3, 6 and 12 show embodiments of a reading arrangement in accordance with the invention.

DETAILED DESCRIPTION OF THE PREFERRED EMBODIMENTS OF THE INVENTION

Figure 4:
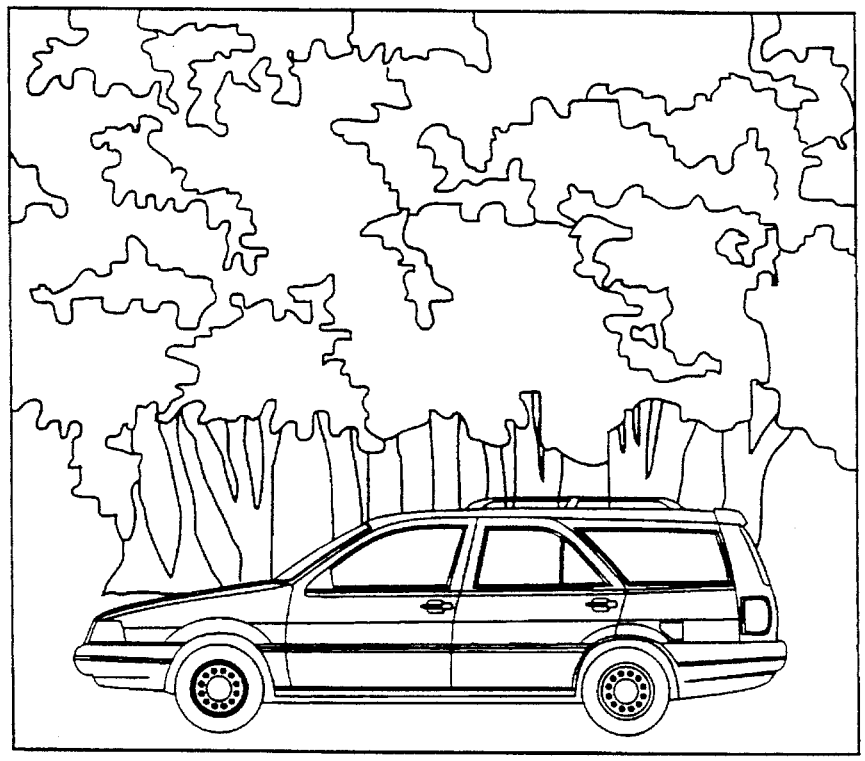
FIGS. 4 and 5 show, by way of illustration, pictures as displayed on a display unit.

The invention will be described on the basis of reading arrangements for reading a so-called Photo-CD, which has been described in detail inter alia in the international Patent Applications WO-92/05556, WO-92/05554, WO-92/05658, WO-92/05653, WO-92/05657, WO-92/05652 and WO-92/05651, which documents are herewith incorporated by reference.

Such a record carrier carries picture information representing a picture composed of a matrix of pixels. For each pixel a signal value has been recorded which represents the luminance value of the relevant pixel. Each picture further contains color information. Moreover, signal values representing the color difference components U and V of the pixels have been recorded with a horizontal and vertical resolution equal to half the resolution of the luminance information.

In the Photo-CD described in the above-mentioned Patent Applications the signal values of consecutive picture lines are not recorded sequentially. It is preferred to arrange the signal values of the picture lines in a manner which deviates slightly from that described in the cited Patent Applications, as will be described below with reference to FIG. 1.

FIG. 2 illustrates diagrammatically the relationship between a picture and the signal values representing the picture. The pixels for which a signal value representing a luminance value has been recorded are shown as dots in FIG. 1. Each luminance value is represented by an 8-bit Y-information word. The pixels to which signal values have been assigned which represent the two color-difference components U and V are shown as crosses. The value of the color-difference component U is represented by an 8-bit U-information word, and the value of the color-difference component V is represented by an 8-bit V-information word. The sequence in which the Y, U, V information is recorded is such that two series of Y-information words, which represent the luminance information of two consecutive pixels, are each time followed by a series C of alternate U and V information words representing the color information associated with the preceding luminance information. FIG. 2 illustrates the sequence of the series Y and C.

FIG. 3 shows a first embodiment of a reading arrangement in accordance with the invention for reading a record carrier in the form of a Photo-CD of a type as described in the foregoing. The arrangement comprises a read unit 1 for reading the signal values from the Photo-CD bearing the reference numeral 2. The arrangement further comprises a picture memory 3 having storage locations which can be addressed via an address bus 4. Information can be loaded into or fetched from an addressed storage location via a data bus. A loading unit 6 is connected to the read unit 1 to receive the signal values being read. The loading unit 6 is also connected to the address bus 4 and the data bus 5. The loading unit 6 is of a customary type which performs a loading process to load the received signal values into the storage locations of the memory. The addresses of the storage locations into which the signal values have been loaded are related to the sequence of receipt. The arrangement comprises a video signal generator 9 for generating a video signal with a specific picture frequency by means of the picture information present in the picture memory 3. For this purpose the video signal generator 9 comprises a fetching unit 7 which, for the purpose of fetching signal values from addressed storage locations, is connected to the address bus 4 and the data bus 5. The fetching unit 7 is of a customary type which fetches the signal values from the memory in a prescribed sequence in synchronism with the generation of the video signal. The video signal generator 9 further comprises a signal converter 8 for deriving the video signal values from the signal values fetched. The signal converter 8 is of a type supplying a video signal of a customary format suited for a video display unit 18, for example a color monitor or a color TV set.

Moreover, a picture adaptation unit 10 is connected to the address bus 4 and the data bus 5. The picture adaptation unit 10 is of a type which performs a non-recurrent information adaptation process upon the signal values of a new picture loaded into the picture memory 3. The picture adaptation performed by the picture adaptation unit 10 serves to eliminate deficiencies or imperfections in the read-out picture which have a disturbing effect in the displayed picture. Examples of such deficiencies and imperfections and the correction method will be described in detail hereinafter.

The memory is of a type which is accessible by only one of the units 6, 7 or 10 at a time. On the basis of predetermined priority rules an arbitration circuit 11 determines which of the units 6, 7 or 10 is given access. In the arrangement in accordance with the invention the priority rules are such that the loading process to performed by the loading unit 6 and the fetching process to be performed by the fetching unit 7 have a higher priority than the information adaptation process to be performed by the picture adaptation unit 10. In order to enable the arbitration circuit 11 to decide which of the units 6, 7 or 10 is to be given access to the picture memory 3 these units apply signals to the arbitration circuit 11 via the signal lines 12, 13 and 14, which signals indicate whether the relevant units request access to the picture memory 3. The arbitration circuit 11 supplies signals indicating whether the requested access to the picture memory has been granted to the units 6, 7 and 10 via the signal lines 15, 16 and 17.

Figure 5:
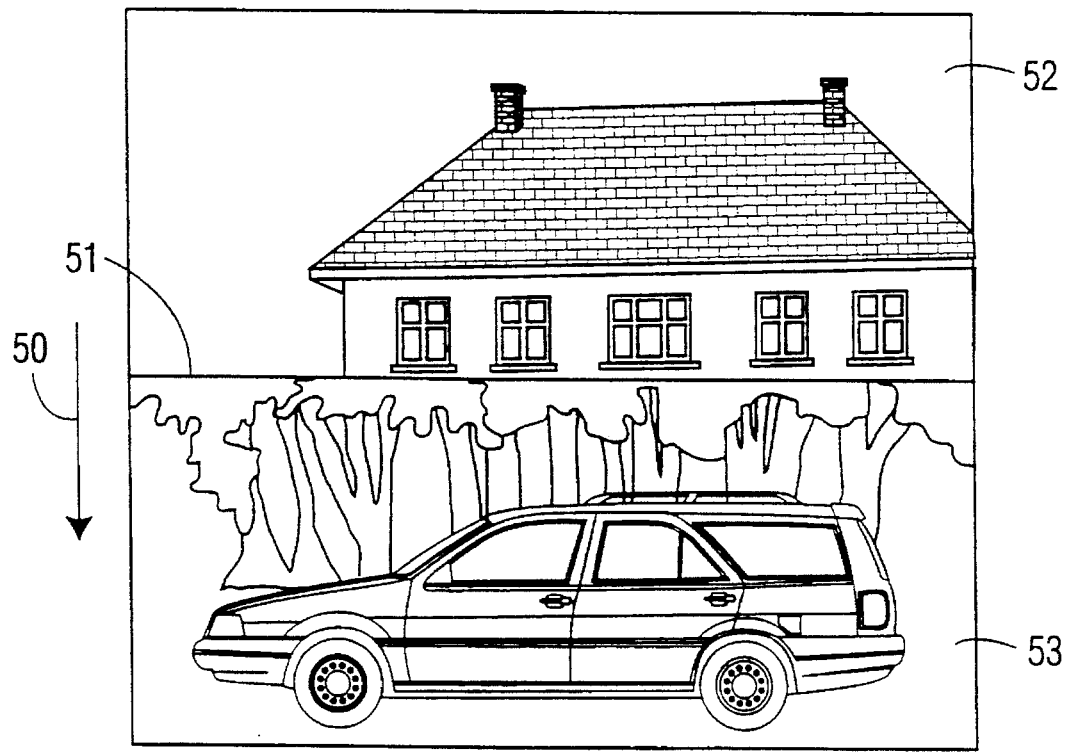

The embodiment of the arrangement shown in FIG. 3 enables a picture displayed on the video display unit 18 to be replaced by a newly read picture using a minimal amount of hardware, as will be explained below. It is assumed that the picture memory has been loaded with the signal values for the picture shown in FIG. 4. If this picture is to be replaced by a new picture to be read from the Photo-CD 2 the read unit 1 is activated in a customary manner to search and read the signal values representing the desired new picture. The manner in which this is effected falls beyond the scope of the present invention and is therefore not described in detail. For further information about this search process reference is made inter alia to the afore-mentioned international Patent Applications. As soon as the read unit 1 has found the desired information it will supply the information to the loading unit 6. The loading unit 6 loads the signal values received from successive lines into the picture memory in the sequence of arrival in time intervals in which the fetching unit 7 has no access to the picture memory, for example during the line retrace and field retrace intervals of the video signal. The speed with which the signal values are read from the Photo-CD 2 is so low that it takes a few seconds for all the signal values of the new picture to be read. This means that the picture originally displayed on the video display unit 18 is replaced by the new picture in a line by line fashion. FIG. 5 by way of illustration shows an image in which the original picture (shown in FIG. 4) has already been replaced partly by a new picture. The upper part 52 of FIG. 5 shows the part of the new picture which has already been loaded into the picture memory and the lower part 53 of FIG. 5 shows the part of the original picture which has not yet been replaced. The new picture gradually expands in the direction indicated by an arrow 50 as the new signal values are loaded. The information about the new picture loaded from the disc into the picture memory exhibits deficiencies or imperfections which affect the quality of the displayed picture. The picture adaptation unit 10 corrects these imperfections in time intervals in which the loading unit 6 and the fetching unit do not require access to the picture memory 3. The rate at which the signal values of the new picture become available is so low that the time available for loading the memory is not wholly utilized by the loading process, so that briefly after the new signal values have been loaded into the picture memory the signal values representing the new picture have already been adapted by the picture adaptation unit. This means that the disturbed area of the displayed picture is small. This area is situated at the transition between the original and the new picture. In FIG. 5 the disturbed area is formed by a strip-shaped portion 51. The strip-shaped portion 51 generally comprises only a few picture lines and is therefore not conspicuous, particularly because this strip is situated in the transitional area between the two pictures.

In the arrangement in accordance with the invention the picture information present in the picture memory is replaced or adapted while this picture information is displayed. This means that only one picture memory is needed. The picture disturbance resulting from the fact that always a small part of the signal values for the new picture has not yet been subjected to picture adaptation is so small that it is not experienced as annoying by the viewer.

In the embodiment described herein the new picture gradually expands from top to bottom. This is caused by the sequence in which the signal values of the pixels have been stored on the Photo-CD 2. It will be evident that a gradual growth of the new picture at the expense of the original picture will proceed differently if the signal values have been stored in another sequence. For example, it is possible to select a storage sequence for which the new picture expands from the center of the display screen towards the edges of the screen, or for which the new picture expands from the corners of the screen towards the center.

The picture adaptation processes performed upon the signal values representing the new picture may be of a different nature depending on the method of recording of the information. When picture information is recorded on a Photo-CD this generally requires two picture adaptation processes. First of all, it is required to make the vertical resolution of the color information equal to the resolution of the luminance information to ensure that both the luminance information and the color information become available for each picture line. In principle, it is possible to increase the vertical resolution after read-out of the picture memory but this requires the use of line memories in the video signal generator 9, which is undesirable in view of the amount of comparatively expensive hardware needed for this.

Secondly, the pictures stored on the Photo-CD still contain high-frequency information which may give rise to annoying picture flicker during reproduction on a display screen. Therefore, it is necessary to filter the picture being read. The filter operation in a horizontal direction cab be effected simply after read-out from the picture memory 3. However, a filter operation in a vertical direction after read-out from the picture memory would again require line buffers, which is undesirable for the reasons mentioned above.

In practice, it has been found that the degree of disturbance experienced by the viewer when the high-frequency information is not filtered out is comparable to the degree of disturbance caused by not increasing the resolution of the color information. When these two picture adaptation processes are applied to the signal values of a newly loaded picture it is important that the two picture adaptation processes remain substantially in step. This means that the part of the picture which has been subjected to only one of the two picture adaptation processes should remain within small limits. In this way it is achieved that the picture area which exhibits disturbances does not become unnecessarily large.

Figure 6:
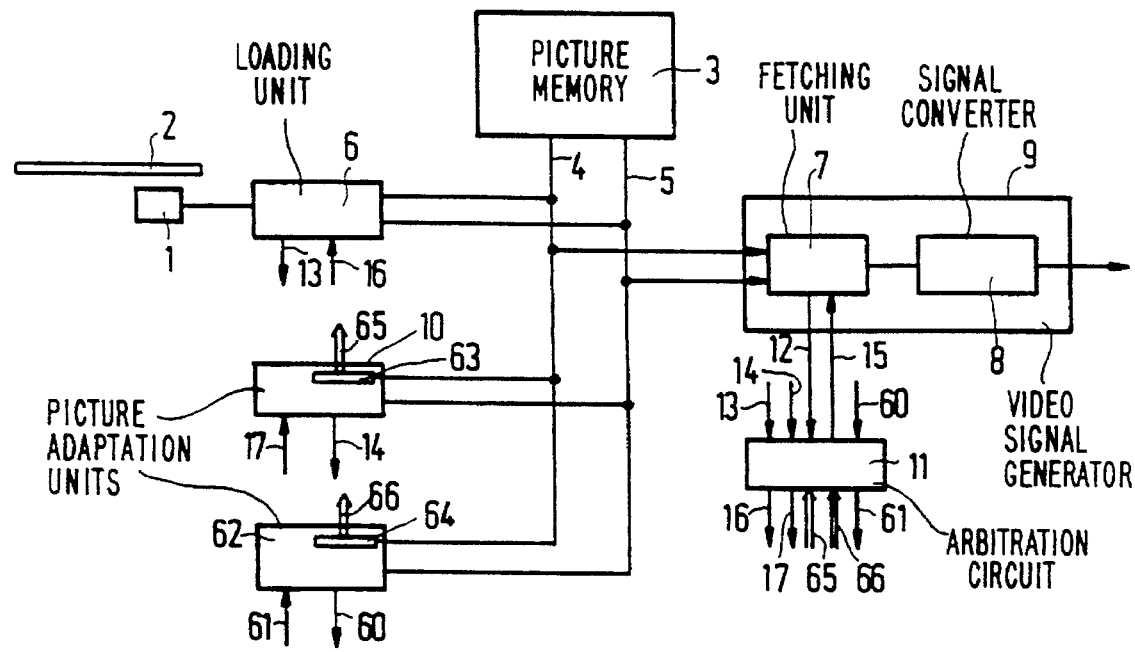

An embodiment of an arrangement in accordance with the invention which comprises provisions to ensure that the two picture adaptation processes remain in step will now be described with reference to FIG. 6. In this Figure parts which are identical to the parts of the embodiment shown in FIG. 3 bear the same reference numerals. In addition to the picture adaptation unit 10 the present embodiment comprises a second picture adaptation unit 62. The picture adaptation unit 62 is connected to the address bus 4 and the data bus 5 for access to the picture memory 3. The picture adaptation unit 62 can apply a request for access to the picture memory 3 to the arbitration circuit 11 via a signal line 60. The arbitration circuit 11 indicates via a signal line 61 whether the request for access is granted.

Figure 7:
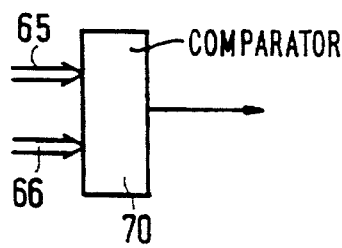
FIG. 7 shows a part of the arbitration circuit for use in the arrangement in accordance with the invention.

The picture adaptation unit 10 comprises an address generator 63 specifying the addresses of the storage locations to be accessed in order to carry out the picture adaptation process. The address generator 63 adapts the address at the end of each process step. Thus, the address generator 63 each time indicates the boundary between the part of the newly loaded picture already adapted and the part of the new picture to be adapted yet. The picture adaptation unit 62 comprises a similar address generator 64 which always also indicates the boundary between the part of the new picture already adapted and the part of the new picture to be adapted yet. The address information supplied by the address generators 63 and 64 is applied to the arbitration circuit 11 via the signal paths 65 and 66. The arbitration circuit 11 is adapted to determine which of the picture adaptation units 10 or 62 is given the highest priority depending on this address information. This can be effected, for example, by means of a comparator circuit 70 (see FIG. 7), to determine which of the two picture adaptation processes leads by comparison of the address information. The result of the comparison indicates which of the two picture adaptation processes is given the highest priority.

Figure 8:
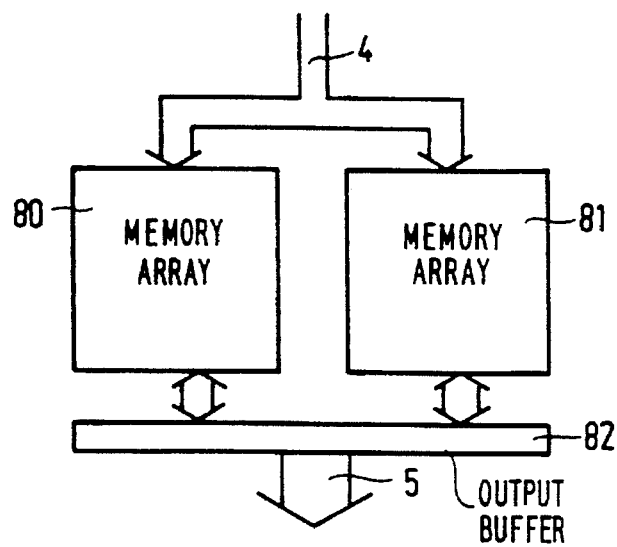
FIG. 8 shows the structure of the picture memory.
Figure 9A:
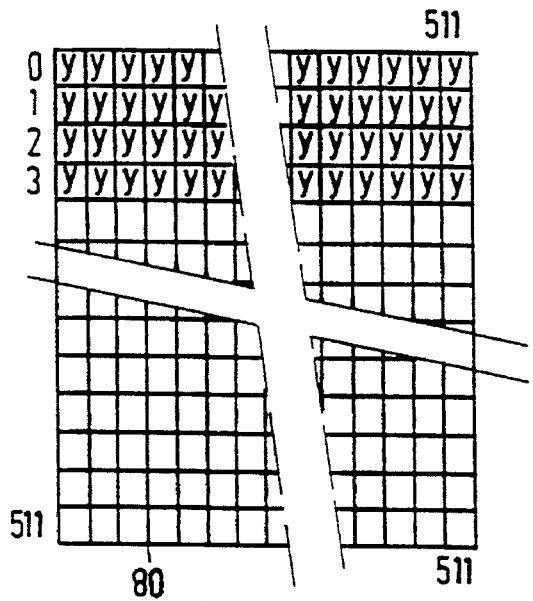
FIGS. 9a and 9b illustrate the manner in which luminance and color information can be stored in the picture memory.
Figure 9B:
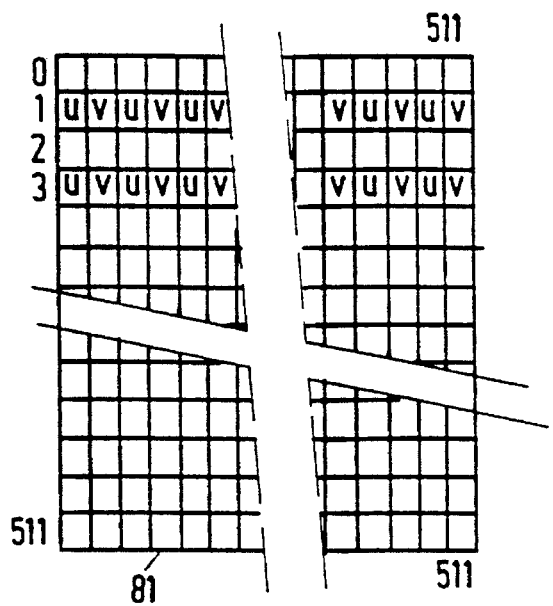

FIG. 8 shows in greater detail a possible structure of the picture memory 3. The shown picture memory 3 comprises two memory arrays 80 and 81 each having 512×512 storage locations of 8 bits each. The two memory arrays 80 and 81 are addressed via the address bus 4. The address comprises a row address RAS and a column address CAS indicating the row and column in which the addressed storage location is situated. The eight data outputs of each of the memory arrays 80 and 81 are applied to the sixteen-bit data bus 5 via an output buffer 82. The memory arrays 80 and 81 can be selected either separately or simultaneously to read or write one or two 8-bit bytes in one memory access cycle into those storage locations of the selected memory array 80 and/or 81 addressed via the address bus 4. One of the memory arrays 80 and 81, for example the memory array 80, is used for the storage of luminance information. The other memory array, in the present case the memory array 81, is used for the storage of color information. When the Photo-CD is read each time two consecutive rows of the memory array 80 is loaded with Y-information words and a row having an odd row address is loaded alternately with U-information words and V-information words. By way of illustration FIG. 9 shows the contents of the memory arrays 80 and 81 in the case that luminance information for the picture lines 0, 1, 2 and 3 and the associated color information has been loaded into the memory array 81. When the memory arrays 80 and 81 are read out for the purpose of video signal generation the memory arrays 80 and 81 are each time selected simultaneously, so that in one memory access cycle each time one byte is read from the memory array 80 and one byte from the memory array 81. From these bytes the video signal generator derives the signal values required for the video signal. The color information from the Photo-CD contains only information for half the number of picture lines (for every alternate picture line). By means of interpolation techniques known per se the color information for the even picture lines can be derived therefrom ion order to achieve that the video signal generator receives color information for every picture line. In the present example said interpolation process is performed by the picture adaptation unit 10. If the luminance information contains high-frequency signal components, as is customary in the case of luminance information stored on a Photo-CD, the picture adaptation unit can perform a filter process.

Figure 14:
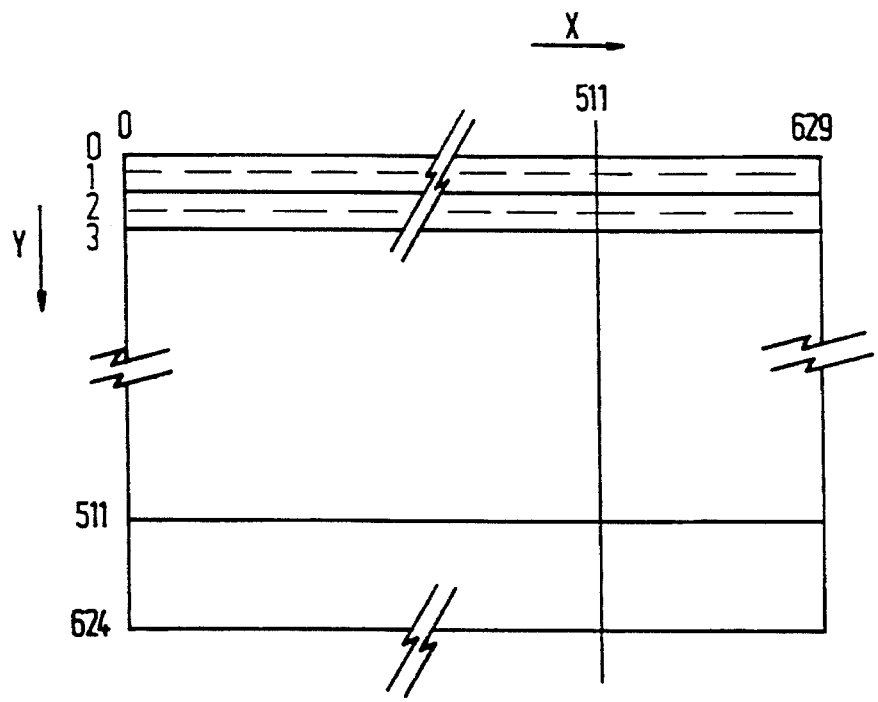
FIG. 14 illustrates diagrammatically the range of the address generator shown in FIG. 13, FIGS. 15a and 15b, 16a and 16b show examples of picture adaptation units.
Figure 13:
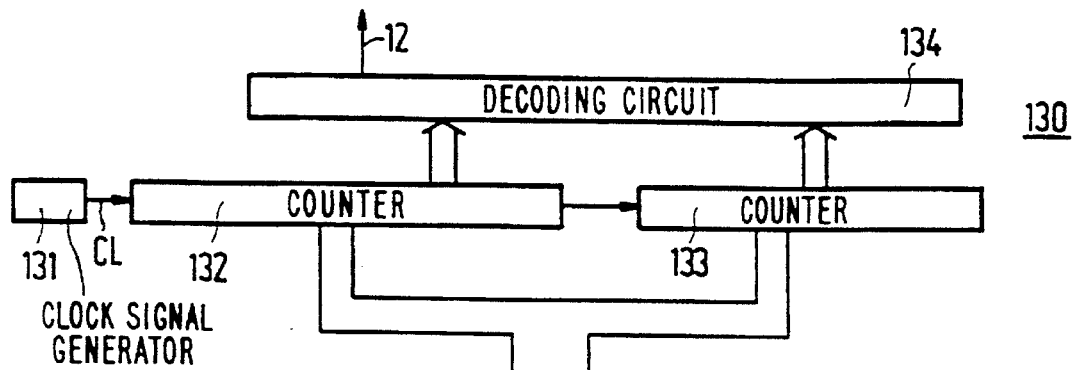
FIG. 13 shows an example of an address generator for use in a fetching unit.

FIG. 13 shows in more detail a part 130 of a version of the fetching unit 7. The shown part comprises a clock signal generator 131 for generating a clock signal c1 having a frequency corresponding to the fetching frequency for fetching the signal values stored in the picture memory 3. This clock signal is applied to a cyclic counter 132 having a counting range corresponding to the length of one video picture line (64 μs for PAL signals). In the present example, in which the number of signal values per picture line is 512, a counting range from 0 to 629 is suitable for the generation of a video signal in accordance with the PAL standard. When the end of the counting range is reached the counter 131 supplies a pulse to a second cyclic counter 132 whose count is adapted in response to each pulse. The counting range of the counter 133 corresponds to the number of lines of which a video picture signal is made up. For a PAL signal this number is 625. The counting cycle of the counter 133 is such that first the even counts are generated and subsequently the odd counts. By way of illustration FIG. 14 shows the counting ranges of the two counters 132 and 133. The counts X of the counter 132 are plotted along the horizontal axis and the counts Y of the counter 133 are plotted along the vertical axis. The range of the counts X between 0 and 511 and the counts Y between 0 and 511 represent the addresses in the picture memory 3 where the signal values of a picture have been stored. If the counts X and Y are situated in this range the fetching unit 7 is given access to the picture memory 3 in order to fetch the signal values from the storage locations specified by the counters 132 and 133. If the counts are outside said range the fetching unit 7 does not request access to the picture memory 3. A decoding circuit 134 derives from the counts of the counters 132 and 133 the signal which indicates when the fetching unit request access to the picture memory 3. This signal is applied to the arbitration circuit 11 via the signal line 12. The clock signal c1 generated by the clock signal generator 131 defines the length of a memory access cycle. This cycle has a constant length corresponding to the period of the clock signal c1. Within one memory access cycle it is possible to carry out one write operation or one read operation in the addressed part of the memory.

Figure 10:
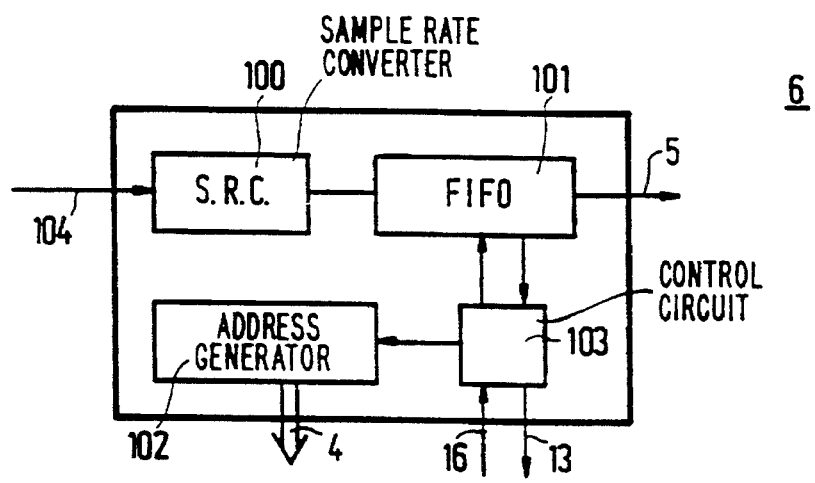
FIG. 10 shows an example of a loading unit.
Figure 11:
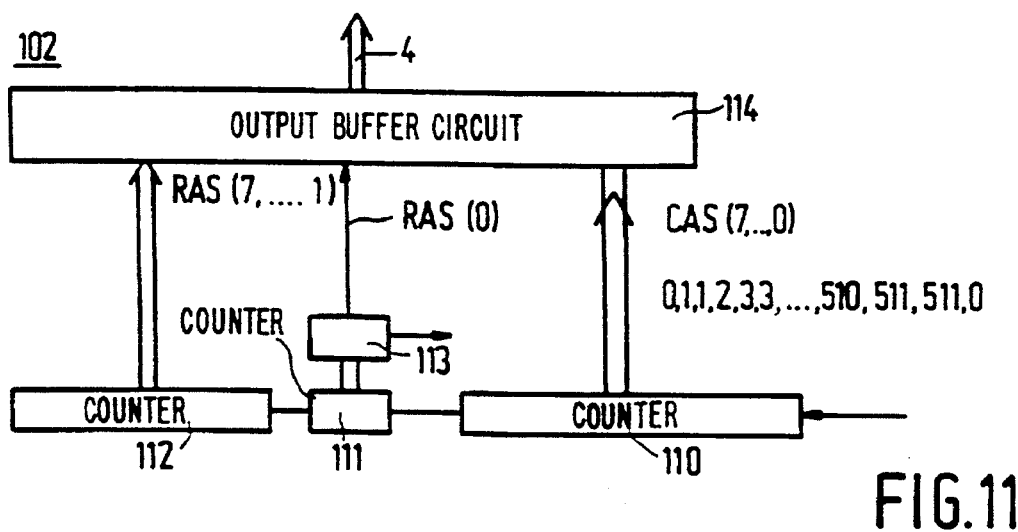
FIG. 11 shows an example of an address generator for use in the loading unit.

FIG. 10 shows an example of the loading unit 6 in more detail. The present loading unit 6 comprises a so-called sample-rate converter 100 which is coupled to the read unit via a signal line 104 to receive the read-out signal values. The converter 100 converts the received signal values having a first sample rate into a new series of signal values having an adapted sample rate so as to adapt the number of signal values per picture line to the storage capacity of the picture memory 3. For a detailed description of the converter 100 reference is made to the afore-mentioned international Patent Application WO 92/05658. The series of signal values is applied to a buffer memory 101 of the First-In-First-Out type (FIFO). The buffer memory 101 has an output coupled to the data bus 5. The loading unit further comprises an address generator 102 for the generation of addresses of the storage locations into which the signal values appearing on the output of the buffer memory 101 are to be loaded. To supply the addresses the address generator is coupled to the address bus 4. The loading unit 6 further has a control circuit 103 coupled to the signal lines 13 and 16 to request access to the memory and to receive a signal indicating that the requested access is granted. The control circuit 103 requests access to the picture memory as long as a there are signal values in the buffer memory 101. As soon as the requested access is granted the control circuit activates the address generator 102 and the buffer memory 101 to supply the signal value at the output of the output buffer to the data bus 5 and to apply to the address bus the address of the storage location where this signal value is to be stored. FIG. 11 shows an example of the address generator 102 in greater detail. The address generator 102 comprises a cyclic counter 110 for generating the column address CAS. The count of the counter 110 is incremented by one after every memory access cycle in which the loading unit 6 has gained access to the picture memory. The counter 110 counts cyclically from 0 to 511. Upon each change from the count 511 to the count 0 a pulse is supplied to a cyclic counter 111 having a counting range of three. In response to each pulse received the count of the counter 111 is incremented by one. The counter 111 indicates whether there are Y-information words in an even row or odd row of the memory array 80, or whether there are U-information and V-information words in a row of the memory array 81. The count of the counter 111 is applied to a decoder circuit 113, which supplies the value 0 or 1 in dependence upon the count. This value represents the least significant bit of the row address RAS. The decoder circuit 113 is constructed in such a manner that the values 0, 1, 1 are supplied successively for the three consecutive counts of the counter 111. The decoder circuit 113 further supplies a selection signal which indicates into which of the two memory arrays 80 and 81 the information is to be loaded. After each counting cycle the counter 111 supplies a pulse to a cyclic counter 112 having a counting range of 256 and whose count is incremented by one upon receipt of each pulse. The count of the counter 112 represents the seven most significant bits of the 8-bit row address RAS. The bits of the address thus generated are applied to the address bus 4 via an output buffer circuit 114. The address generator described above the generates the addresses of an even and subsequent add rows in the memory array 80 for the storage of luminance information and subsequently the addresses of an odd row of storage locations in the memory array 81 for the storage of the received color information.

In the example of the loading unit 6 described above this unit successively stores two lines of luminance information and then one line of color information in the picture memory. However, it is also possible to carry out the loading process for the luminance information and the loading process for the color information as two independent processes. This means that the loading unit comprises both a luminance FIFO buffer for the temporary storage of the luminance information being read and a separate color FIFO buffer for the storage of color information. Depending on the difference in the degree of filling of the two FIFO buffers an information word is fetched from the luminance FIFO buffer or from the color FIFO buffer and is loaded into the picture memory.

As described already, the picture adaptation unit 10 can be used for increasing the vertical resolution of the color information. The following equation (1) defines a suitable interpolation process $$S_{2i,j} := (S_{2i-1,j} + S_{2i+1,j})/2 \tag{1}$$

where i is an integer between 1 and 255,
and j is an integer between 0 and 511,
where S represents a signal value of the color-difference signal values (U or V) stored in the memory array 81,
i indicates the row address, j indicates the column address.

Figure 15A:
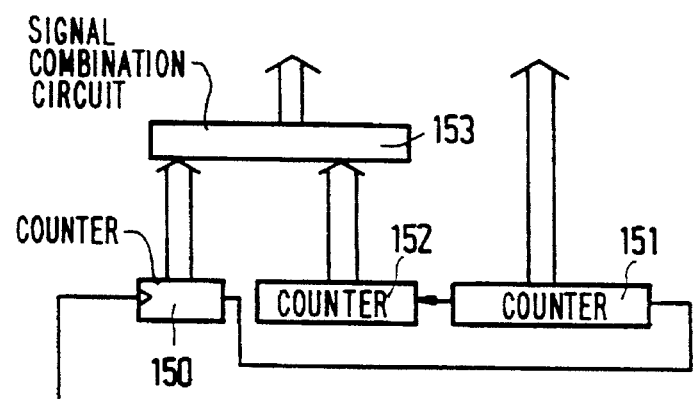
Figure 15B:
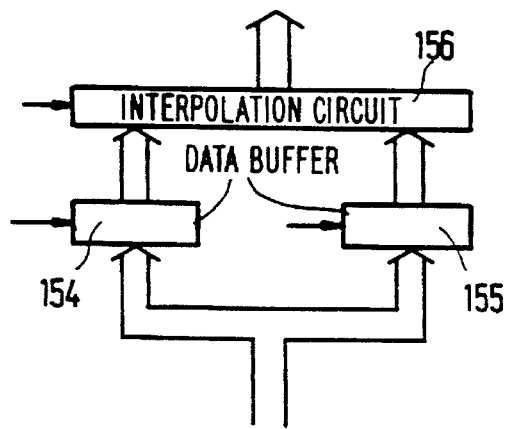

FIGS. 15a and 15b show an example of a picture adaptation unit 10 for carrying out the picture adaptation defined in equation (1). FIG. 15a shows an address generator for generating the addresses of the storage locations to which access is required in order to perform the picture adaptation process. The address generator comprises a cyclic counter 150 having a counting range of three. The count of the counter 150 is adapted after every memory access cycle in which the picture adaptation unit has been given access to the picture memory. Each time that the counter 150 has reached its maximum count a pulse is supplied to a cyclic counter 151, which increments its count by one in response to this pulse. The counting range of the counter 151 is equal to the number of storage locations per row. The count of the counter 151 represents the column address which can be applied to the address bus 4. Each time that the counter 151 reaches its maximum count a pulse is supplied to a cyclic counter 152 whose count is adapted in response to this pulse. The count of the counter 152 corresponds to the number of rows in the memory array 81 in which the color-difference signal values obtained by interpolation are to be stored. A signal combination circuit 153 derives the row address of the storage location to be accessed from the counts of the counters 150 and 152.

FIG. 15b shows a part of the picture adaptation unit for carrying out the interpolation process. This part comprises two data buffers 154 and 155 connected to the data bus 6 for the storing the signal values to be read from the picture memory for the purpose of interpolation. The interpolation process is effected by an interpolation circuit 156 having inputs coupled to the outputs of the data buffers 154 and 155 to receive the contents of these data buffers. The output of the interpolation circuit 156 is coupled to the data bus 5 to supply the interpolation result to the addressed storage location.

The picture adaptation unit 10 operates as follows. When the picture adaptation unit has gained access to the picture memory 3 the address generated by the address generator is applied to the picture memory 3 via the address bus 4. Depending on the count of the counter 150 a read or write operation is performed at the addressed storage location. If the count indicates that a read operation is to be performed this count is used for determining to which of the data buffers the read-out signal value is to be applied. If a write operation is to be performed the result at the output of the interpolation circuit is written into the addressed storage location. After each read or write operation the count of the counter 150 is adapted in order to ensure that in the next memory access cycle in which the picture adaptation unit has again access to the picture memory 3 the address of the storage location to be accessed has been adapted. The sequence in which the picture adaptation unit 10 is given access is always such that in a series of three memory access cycles one signal value is determined and stored. In the first two memory access cycles the signal value is then read from the addressed column of the row 2I−1 and 2I+1 and is applied to the data buffers 154 and 155. In the last one of the series of three memory access cycles the result thus obtained is stored in the storage location in the addressed column of the row 2i. Subsequently, the column address is incremented. After the signal values of a whole row have been determined and stored the row address is adapted.

It is to be noted that other interpolation processes than defined by equation (1) are possible. For example, in the case that a part of the read-out picture is to be displayed enlarged by a factor of two (in the vertical and the horizontal direction) three lines of color information instead of one line of color information must be inserted between two read-out lines of color information. Indeed, only one line of color information is read out for every four lines of the picture to be displayed. Moreover, it will be evident to those skilled in the art that other interpolation methods may be used, employing the color information of a larger number of pixels to determine the added color information.

The picture adaptation unit 62 subjects the luminance signal values stored in the memory array 80 to a filter process. The following equation (2) defines a suitable filter process.

$$S_{i,j}:=F_0 \cdot S_{i,j}+F_1 \cdot S_{i+1,j}+F_2 \cdot S_{i+2,j} \quad (2)$$

where i is an integer between 0 and 509, j is an integer between 0 and 511, and where S is the signal value in the addressed storage location, i represents the row address of the addressed storage location, j represents the column address of the addressed storage location, and $F_0$, $F_1$ and $F_2$ are filter coefficients.

Figure 16A:
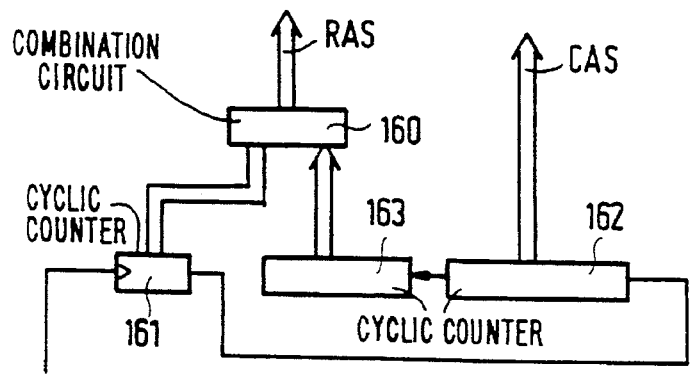
Figure 16B:
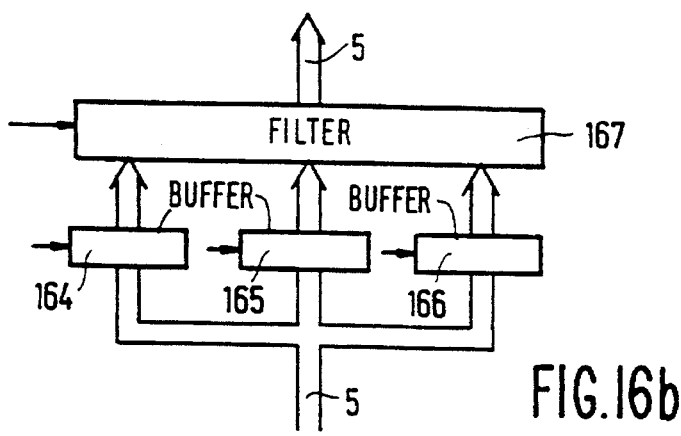

FIGS. 16a and 16b show a suitable example of the picture adaptation unit for carrying out the filter process defined by equation (2). FIG. 16a shows an address generator. This address generator comprises a cyclic counter 161 having a counting range equal to four. The count of the counter 161 is adapted after each memory access cycle in which the picture adaptation unit has been given access to the picture memory 3. To determine each signal value of the filtered picture the picture memory should be accessed four times. First of all, it is required three times to have access to a signal value in three consecutive rows in order to retrieve the signal values required for the filter process from the memory. Subsequently, the memory is to be accessed one more time in order to load the result of the filter process into the memory. The count of the counter 161 indicates whether a read operation or a write operation is to be performed in the memory and which row is to be addressed. Each time that the counter 161 has traversed the four consecutive counts the filter process for a pixel is completed and the filter process for the next pixel can be performed. The counter 161 then supplies a pulse to a cyclic counter 162 having a counting range corresponding to the number of storage locations of each row of the picture memory 3. The count of the counter 162 always specifies the column address of the storage locations to be accessed. The count of the counter 162 is adapted in response to the pulse supplied by the counter 161. If the counter 162 has reached its maximum position this counter supplies a pulse to a cyclic counter 163 having a range corresponding to the number of picture lines to be filtered from the counts of the counter 163 and the counter 161 a combination circuit 160 derives the row address of the storage location to be accessed. To determine the filtered signal value $S_{i,j}$ the row i, the row i+1 and the row i+2 are successively addressed in order to fetch the signal values. Subsequently, the row i is addressed again to store the result of the filter process.

FIG. 16b shows an example of a circuit for carrying out the filter process. This circuit comprises three data buffers 164, 165 and 166 having inputs coupled to the data bus for receiving and storing the signal values fetched from the picture memory 3 in the first three consecutive memory access cycles indicated by the counter 161. Selection of the data buffer to be used for storage is based on the count of the counter 61. The outputs of the buffers 164, 165 and 166 are coupled to a filter circuit 167 for determining the filtered signal value in accordance with the relationship defined in equation (2). The filter circuit 167 has an output coupled to the data bus 5 to apply the result of the filter process to the addressed storage location. The instant at which the result is supplied to the data bus is determined by means of the count of the counter 161.

It is to be noted that the luminance information can also be subjected to other picture adaptation processes than the filter process defined by equation (2). For example, in the case that a part of the read-out picture is to be displayed with a magnification factor of 2 it is desirable to use an interpolation process instead of a filter process.

Figure 17:
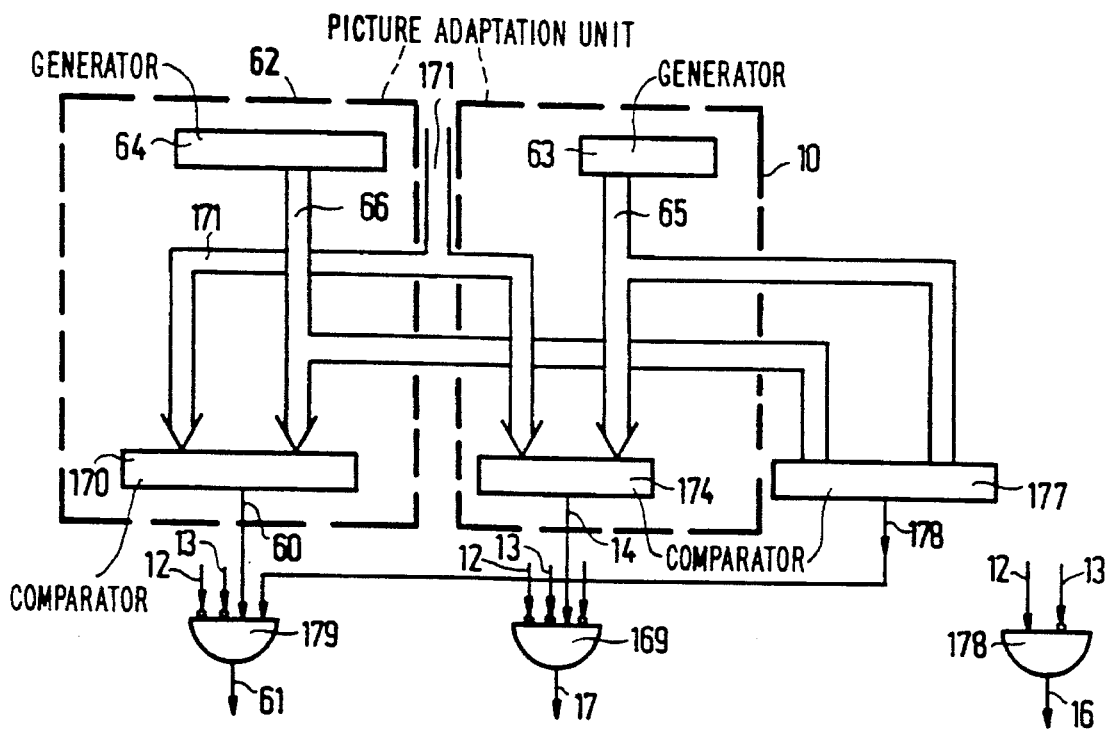
FIG. 17 shows an example of an arbitration circuit.

FIG. 17 shows an example of the arbitration circuit 11, together with parts of the picture adaptation units 10 and 62, for determining whether the picture memory is to be accessed. To determine whether the picture memory 3 is to be accessed the picture adaptation unit 62 comprises a comparator circuit 170 having two inputs, of which one input is connected to a signal path 171 for receiving the row address supplied by the address generator of the loading unit 6. The other input of the comparator circuit 170 is connected to the signal path 66 for receiving the row address supplied by the address generator 64 of the picture adaptation unit 62. The comparator circuit 171 tests whether the row address supplied by the address generator of the loading unit is at least three greater than the row address supplied by the address generator of the picture adaptation unit 62. If this requirement is met this means that an adequate number of new rows is available in the picture memory 3 to carry out the filter process. The comparator circuit 170 supplies a signal via the signal line 60 to indicate that said requirement is met and, consequently, the picture memory 3 is to be accessed. To determine whether access to the picture memory 3 is required the picture adaptation unit 10 comprises a comparator circuit 174 having two inputs. One of the inputs is coupled to the data path 171 to receive the row address supplied by the address generator of the loading unit 6. The row address supplied by the address generator 63 of the picture adaptation unit 10 is applied to the other input of the comparator circuit 174 via the signal path 65. On the basis of the applied row addresses the comparator circuit 174 checks whether an adequate number of new rows is available in the picture memory to carry out the interpolation process and, consequently, the picture memory 3 is to be accessed. A signal which indicates that said requirement is met is supplied via the signal line 14. The arbitration circuit 11 comprises a comparator circuit 177 which compares the row addresses generated by the address generator 63 of the picture adaptation unit 10 and the address generator 64 of the picture adaptation unit 62 with each other. These row addresses are applied to the inputs of the comparator circuit 177. By comparing the received row addresses the comparator circuit 177 checks which of the picture adaptation processes is advanced with respect to the other. In fact, the applied row addresses always indicate how far the different picture adaptation processes have progressed. The result of the test carried out by the comparator circuit 177 is supplied via a signal line 178.

The arbitration circuit 11 comprises an AND gate 178 for deriving from the signals applied via the signal lines 12 and 13 a signal which indicates that the loading unit 6 is given access to the picture memory.

An AND gate 169 derives from the signal values on the signal lines 12, 13, 14 and 178 a signal which indicates whether or not the picture adaptation unit 62 is given access to the picture memory. By means of an AND gate 179 it is likewise determined whether or not the picture adaptation unit is given access to the picture memory 3. The signal line 178, which carries a signal which indicates which of the picture adaptation processes is advanced with respect to the other, is connected to an inverting input of the gate 180 and to a non-inverting input of the gate 179. This ensures that the most advanced picture adaptation process is given access to the picture memory and that the picture adaptation processes consequently remain in step with one another. On the basis of the current address information generated by the various units the arbitration circuit shown in FIG. 17 constantly determines which of the units is given access to the picture memory 3. As a result of this, the waiting time for the picture adaptation processes to be carried out with a high priority is minimized. This means that if buffer memories are used for the temporary storage of the information during the time that no access to the picture memory is obtained, these buffer memories can also be small.

The embodiment of the device in accordance with the invention described above only uses the row address to determine which of the processes is advanced with respect to the other. It is obvious that for this determination it is also possible to consider the column address. This results in a more accurate determination but the amount of hardware required for this is comparatively large in relation to the advantage of a higher accuracy.

In the embodiment described above the picture memory is loaded in a row-by-row fashion and the loaded information is also fetched in a row-by-row fashion. However, the invention can also be used in to those cases in which the loading process of the memory proceeds in a column-by-column fashion and the information is retrieved in a row-by-row fashion in order to rotate the picture. Moreover, it is to be noted that the invention is not limited to its use in combination with a Photo-CD. The invention can be used likewise in conjunction with record carriers of other types.

Finally, it is to be noted that it may be useful to employ the picture memory for possible other processes. As a matter of fact, the overhead needed for controlling a memory, such as for example the so-called refresh circuits in the case of dynamic RAMs, increases to a comparatively small extent as the storage capacity is increased. Moreover, the storage capacity of commercially available memory devices by means of which memories are formed increases continually. This means that if a process requires a comparatively small storage capacity the minimum storage capacity attainable by means of the memory devices is overdimensioned to a considerable extent.

Figure 12:
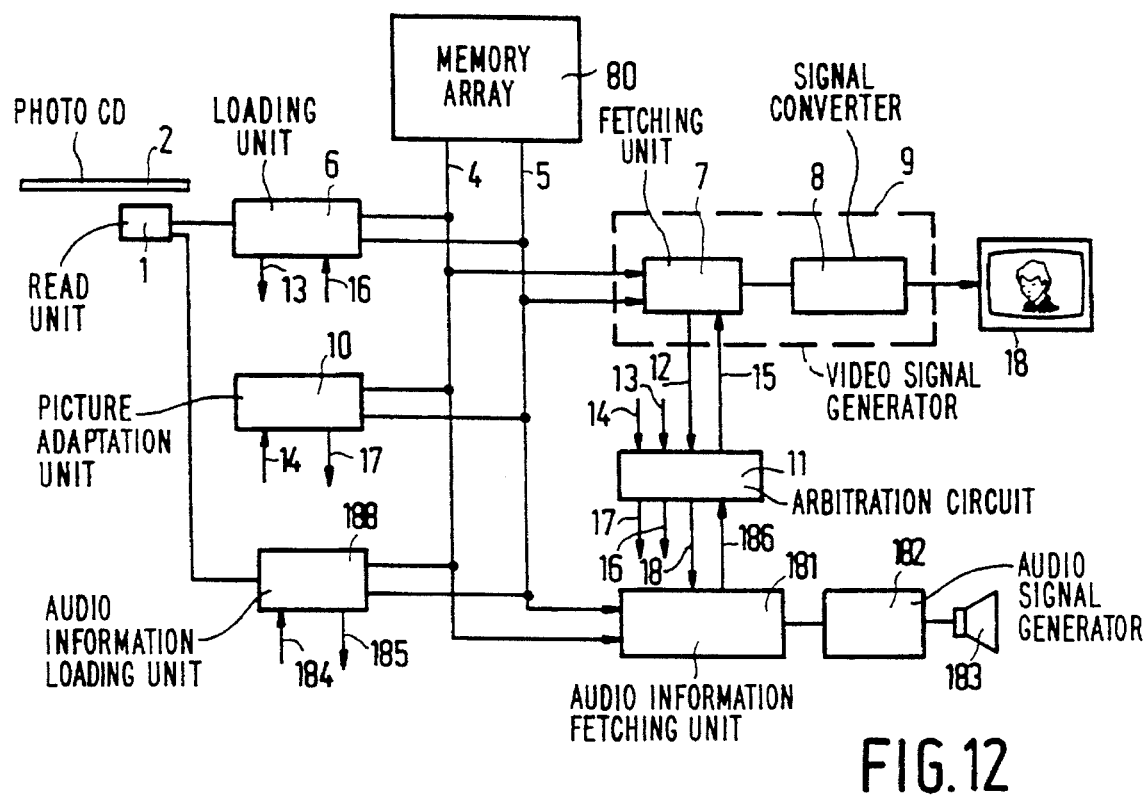

An example of such an additional process having access to the picture memory is the time expansion process to be carried out if a Photo-CD in addition to the picture information also stores time-compressed audio information, for example in the form of so-called ADPCM coded audio information. FIG. 12 shows an embodiment of the device in accordance with the invention in which an information processing unit for carrying out a time expansion process also has access to the picture memory. In this Figure elements corresponding to those of the embodiment shown in FIG. 3 bear the same reference numerals. In FIG. 12 the picture memory bears the reference numeral 180. The storage capacity of the picture memory 180 is large in comparison with that of the picture memory 3 in order to store audio information. This audio information has been recorded on the Photo-CD in time-compressed form. This information can be read by means of the read unit 1, which has an additional output for supplying the audio information. This output is coupled to an audio-information loading unit 188 which is adapted to load the received audio information into an appropriate part of the picture memory 180. For this purpose the audio-information loading unit is coupled to the address bus 4 and the data bus 5. The audio information stored in the picture memory 180 is fetched from this memory 180 by an audio-information fetching unit 181, which for this purpose is also coupled to the address bus 4 and the data bus 5. The audio-information fetching unit 181 supplies the fetched audio information to an audio signal generator 182 at a rate corresponding to the desired audio reproduction speed. From the received audio information the audio signal generator 182 derives an audio reproduction signal adapted to drive an electroacoustic transducer 183, such as for example a loudspeaker or headset. The audio-information loading unit 188 and the audio-information fetching unit must share the available access time to the picture memory 180 with the loading unit 6, the fetching unit 9, the picture adaptation unit 10 and any further picture adaptation units. On the basis of the predetermined priority rules the arbitration circuit again determines which of the units is give access to the picture memory 180. For this purpose the units 182 and 188 are coupled to the arbitration circuit via the signal-line pair 186, 187 and the signal-line pair 184, 185 respectively. Since a tardy retrieval of information by the units 9 and 181 leads to a seriously disturbed reproduction of picture or sound and a delayed loading of the read-out information by the units 6 and 188 leads to an incorrigible loss of read-out information it is preferred to assign a higher priority to the units 6, 9, 188 and 182 than to the picture adaptation unit 10. Indeed, the picture adaptation process is not critical in the sense that incorrigible errors may arise when the picture adaptation process is delayed. A delay merely results in the part of the new picture on the display screen which has not yet been adapted temporarily increasing in size.

We claim:

1. An apparatus for generating a video signal representative of still pictures, and providing a smooth shift between one picture and a new picture, wherein said one picture and said new picture are based on respective stored still picture information which requires picture data processing between read-out and video signal generation, comprising:

a picture memory having addressable storage locations for storage of signal values representing the pixels of said one picture, video signal generating means for continuously generating, at a predetermined picture rate, a video signal defined by the stored signal values, said video signal generating means comprising means for carrying out a fetching process in which the signal values are periodically fetched from the storage locations of the picture memory in a predetermined sequence, and means for converting the fetched signal values into the video signal, a record carrier reader for reading picture information of the new picture recorded on the record carrier, and first means for carrying out a loading process in which previously stored signal values in respective storage locations are replaced by new signal values based on picture information of said new picture, characterized in that the apparatus further comprises:

second means for carrying out at least one information adaptation process on new signal values stored in the corresponding storage locations, said information adaptation process changing at least a part of the stored signal values, wherein said second means comprises:

means for fetching signal values from the picture memory, and means for adapting the fetched values by a predetermined adaptation process, and control means for alternately giving a selected one of the processes exclusive access to the picture memory during generation of video signals, said control means including arbitration means for determining which of the processes is selected for access to the picture memory, said arbitration means giving lower priority to the information adaptation process than to the fetching and loading processes.

2. An apparatus as claimed in claim 1, further characterized in that each time the control means gives one of the processes access to the picture memory during a memory access interval, and prior to the beginning of each memory access interval the arbitration means determines which of the processes is to be given access to the picture memory in accordance with priority rules.

3. An apparatus as claimed in claim 1, further characterized in that the means for carrying out the loading process comprises a buffer for temporarily storing the read-out signal values until the loading process has loaded said signal values into the picture memory, and the arbitration means assigns to the fetching process a higher priority than the priority of the loading process.

4. An apparatus as claimed in claim 1, further comprising means for carrying out additional processes requiring exclusive access to the picture memory, and further characterized in that the arbitration means assigns a higher priority to the additional processes than to the information adaptation processes.

5. An apparatus as claimed in claim 1, further characterized in that the means for carrying out the loading process comprises a buffer for temporarily storing the read-out signal values until the loading process has loaded said signal values into the picture memory, and the arbitration means assigns to the fetching process a higher priority than the priority of the loading process.

6. An apparatus as claimed in claim 5, further characterized in that each time the control means gives one of the processes access to the picture memory during a memory access interval, and prior to the beginning of each memory access interval the arbitration means determines which of the processes is to be given access to the picture memory in accordance with priority rules.

7. An apparatus as claimed in claim 6, further characterized in that the means for carrying out the loading process comprises a buffer for temporarily storing the read-out signal values until the loading process has loaded said signal values into the picture memory, and the arbitration means assigns to the fetching process a higher priority than the priority of the loading process.

8. An apparatus as claimed in claim 1, further characterized in that said predetermined adaptation process includes interpolation.

9. An apparatus as claimed in claim 1, further characterized in that said predetermined adaptation process includes weighting a combination of a plurality of signal values stored in consecutive memory locations.

10. An apparatus for generating a video signal representative of still pictures, and providing a smooth shift between one picture and a new picture, wherein said one picture and said new picture are based on respective stored still picture information which requires picture data processing between read-out and video signal generation, comprising:

a picture memory having addressable storage locations for storage of signal values representing the pixels of said one picture, video signal generating means for continuously generating, at a predetermined picture rate, a video signal defined by the stored signal values, said video signal generating means comprising means for carrying out a fetching process in which the signal values are periodically fetched from the storage locations of the picture memory in a predetermined sequence, and means for converting the fetched signal values into the video signal, a record carrier reader for reading picture information of the new picture recorded on the record carrier, and first means for carrying out a loading process in which previously stored signal values in respective storage locations are replaced by new signal values based on picture information of said new picture, characterized in that the apparatus further comprises:

second means for carrying out at least one information adaptation process on new signal values stored in the corresponding storage locations, said information adaptation process changing at least a part of the stored signal values, wherein said second means comprises:

means for fetching signal values from the picture memory, and means for adapting the fetched values by a predetermined adaptation process, means for carrying out at least a second information adaptation process based on the new signal values stored in the corresponding storage locations, said second information adaptation process changing at least a part of the new signal values, and control means for alternately giving a selected one of the processes exclusive access to the picture memory during generation of video signals, said control means including arbitration means for determining which of the processes is selected for access to the picture memory, said arbitration means giving lower priority to the information adaptation process than to the fetching and loading processes, and further characterized in that the means for carrying out the first and the second information adaptation processes comprise first and second address-generating means for generating a first address and a second address, the first address indicating the transition between the storage locations with signal values already adapted by the first information adaptation process and the storage locations with signal values yet to be adapted by the first information adaptation process, and the second address indicating the transition between the storage locations with signal values already adapted by the second information adaptation process and the storage locations with signal values yet to be adapted by the second information adaptation process, and the arbitration means assigns priorities to the first and the second information adaptation process responsive to the difference between the first and the second address, to keep said difference within predetermined limits.

11. An apparatus as claimed in claim 10, further characterized in that each time the control means gives one of the processes access to the picture memory during a memory access interval, and prior to the beginning of each memory access interval the arbitration means determines which of the processes is to be given access to the picture memory in accordance with priority rules.

12. An apparatus as claimed in claim 10, further characterized in that the means for carrying out the loading process comprises a buffer for temporarily storing the read-out signal values until the loading process has loaded said signal values into the picture memory, and the arbitration means assigns to the fetching process a higher priority than the priority of the loading process.

13. An apparatus as claimed in claim 10, further comprising means for carrying out additional processes requiring exclusive access to the picture memory, and further characterized in that the arbitration means assigns a higher priority to the additional processes than to the information adaptation processes.

14. An apparatus as claimed in claim 10, further characterized in that the means for carrying out the loading process comprises a buffer for temporarily storing the read-out signal values until the loading process has loaded said signal values into the picture memory, and the arbitration means assigns to the fetching process a higher priority than the priority of the loading process.

15. An apparatus as claimed in claim 14, further characterized in that each time the control means gives one of the processes access to the picture memory during a memory access interval, and prior to the beginning of each memory access interval the arbitration means determines which of the processes is to be given access to the picture memory in accordance with priority rules.

16. An apparatus as claimed in claim 15, further characterized in that the means for carrying out the loading process comprises a buffer for temporarily storing the read-out signal values until the loading process has loaded said signal values into the picture memory, and the arbitration means assigns to the fetching process a higher priority than the priority of the loading process.

17. An apparatus as claimed in claim 10, further characterized in that said predetermined adaptation process includes interpolation.

18. An apparatus as claimed in claim 10, further characterized in that said predetermined adaptation process includes weighting a combination of a plurality of signal values stored in consecutive memory locations.

* * * * *